United States Patent [19]

Koshimizu et al.

[11] 4,356,694
[45] Nov. 2, 1982

[54] MASTER CYLINDER HAVING A FLUID PRESSURE CONTROL VALVE MECHANISM

[75] Inventors: Naganori Koshimizu; Koichi Shiiya, both of Yokohama, Japan

[73] Assignee: Tokico Ltd., Kawasaki, Japan

[21] Appl. No.: 143,477

[22] Filed: Apr. 22, 1980

Related U.S. Application Data

[63] Continuation of Ser. No. 920,357, Jun. 29, 1980, abandoned.

[51] Int. Cl.³ .............................................. B60T 11/20
[52] U.S. Cl. ...................................... 60/562; 60/561; 60/591
[58] Field of Search .................. 60/561, 562, 581, 591

[56] References Cited

U.S. PATENT DOCUMENTS

| | | | |
|---|---|---|---|
| 3,186,174 | 6/1965 | Hayman | 60/591 |
| 3,214,913 | 11/1965 | Hayman | 60/591 |
| 3,229,467 | 1/1966 | Lepelletier | 60/561 |
| 3,431,729 | 3/1969 | Randol | 60/561 |
| 4,024,712 | 5/1977 | Takeuchi | 60/591 |
| 4,084,377 | 4/1978 | Gaiser | 60/592 |

FOREIGN PATENT DOCUMENTS

| | | | |
|---|---|---|---|
| 1938733 | 2/1971 | Fed. Rep. of Germany | 60/562 |
| 46-17244 | 5/1971 | Japan . | |
| 49-125776 | 12/1974 | Japan . | |

*Primary Examiner*—Abraham Hershkovitz
*Attorney, Agent, or Firm*—Wenderoth, Lind & Ponack

[57] ABSTRACT

A master cylinder having a fluid pressure control valve mechanism which is constituted by a cylinder body, pistons slidably received in the cylinder body for defining pressure chambers in cooperation with each other and with one end wall of the cylinder body, respectively, a fluid pressure supply chamber in communication with a reservoir and isolated from the pressure chambers, a fluid pressure passage extending between one of the pressure chambers and a brake cylinder and a fluid pressure control valve mechanism having an annular space in communication with the fluid pressure supply chamber and isolated from the one pressure chamber.

3 Claims, 1 Drawing Figure

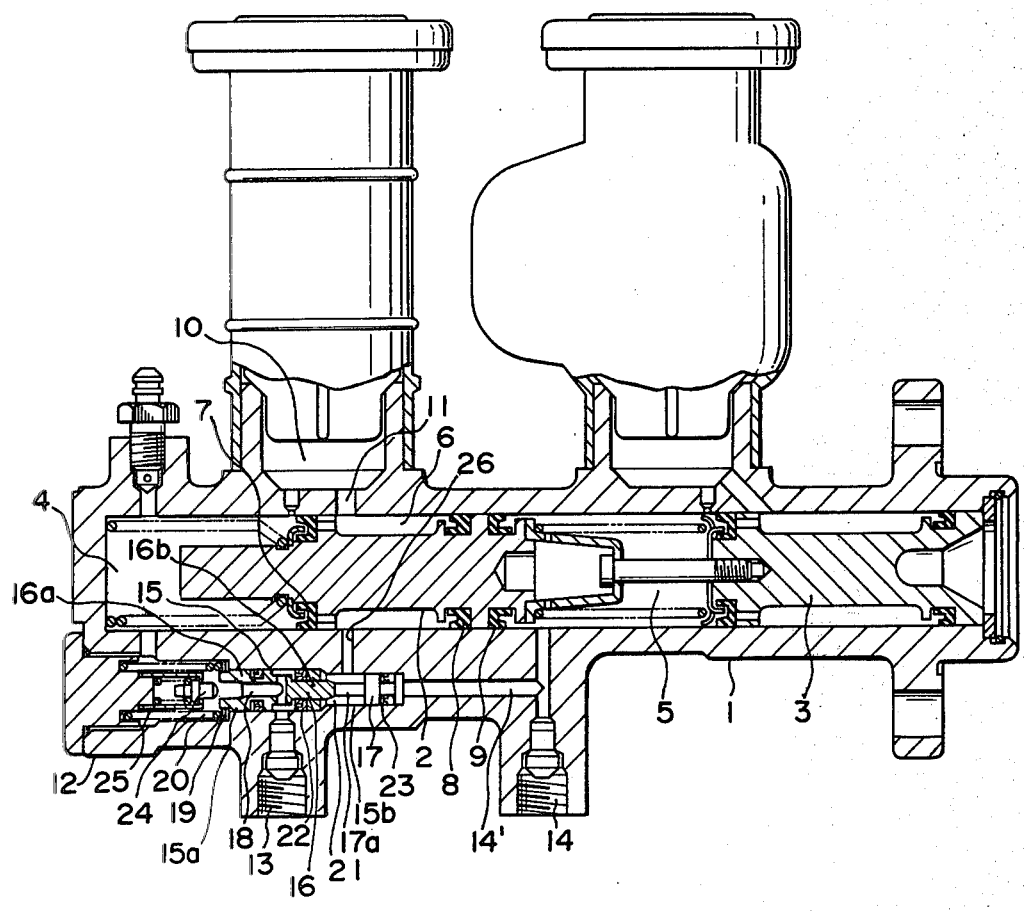

4,356,694

MASTER CYLINDER HAVING A FLUID PRESSURE CONTROL VALVE MECHANISM

This is a continuation of application Ser. No. 920,357, filed June 29, 1980, now abandoned.

BACKGROUND OF THE INVENTION

This invention relates to a master cylinder and more particularly, to a master cylinder having a fluid pressure control valve mechanism for adjusting the fluid pressure distribution between front and rear wheel brake systems in a vehicle such as an automobile, the brake systems being of the type in which the pistons are slidable in the control valve mechanism without being obstructed by trapped fluid pressure.

A variety of master cylinders having a fluid pressure control valve are known and one of the prior art master cylinders is the so-called "two system" brake mechanism in which a front wheel brake and one fluid pressure chamber of the master cylinder constitute one fluid pressure system and a rear wheel brake and the other fluid pressure chamber of the master cylinder constitute the other fluid pressure system, the master cylinder having a fluid pressure control valve mechanism integrally formed therewith to control the pressure in front and rear brakes to a predetermined level. In one of the prior art fluid pressure control mechanisms referred to hereinabove, a stopped piston having a larger diameter portion and a smaller diameter portion and a differential piston having a diameter smaller than that of the larger diameter portion of the piston but larger than that of the smaller diameter portion of the piston are slidably received in end-to-end abutting relationship in the body of the control valve mechanism, a communication passage extends between the other pressure chamber of the master cylinder and a rear wheel brake and a valve for opening and closing said communication passage are provided in the stepped piston. A biasing force is applied to one end of the stepped piston by the rear wheel brake fluid pressure and the pressure of a spring and the front wheel brake fluid pressure is applied to one end of the differential piston whereby the fluid pressure distribution between the rear wheel and front wheel brake systems is so controlled that when a predetermined braking force is applied, the fluid pressure on the rear wheel brake is smaller than that of the front wheel brake. However, in this prior art fluid pressure control valve mechanism, when oil under pressure from the passage between the master cylinder and brake systems leaks into and is trapped in the annular space defined between the stepped piston and the differential piston, the slidable movement of the differential piston is impeded to such a degree that the control valve mechanism can not function satisfactorily.

SUMMARY OF THE INVENTION

The purpose of the present invention is to provide a master cylinder having a fluid pressure control valve mechanism which can effectively eliminate the disadvantages inherent in the prior art master cylinders of this type. In order to attain this purpose, according to the present invention, the fluid pressure leaking into the annular space defined between the stepped piston and differential piston is returned to the reservoir at atmospheric pressure.

The above and other objects and attendant advantages of the present invention will be more readily apparent to those skilled in the art from a reading of the following detailed description in conjunction with the sole figure of the accompanying drawing which shows one embodiment of the invention for illustration purpose only, but not for limiting the scope of the same in any way.

BRIEF DESCRIPTION OF THE DRAWING

The sole FIGURE of the accompanying drawing is a side elevational view in partial section of one embodiment of master cylinder having a fluid pressure control valve mechanism constructed in accordance with the present invention.

PREFERRED EMBODIMENT OF THE INVENTION

The present invention will now be described referring to the sole FIGURE of the drawing in which the one preferred embodiment of master cylinder having a fluid pressure control valve mechanism of the invention is shown. The master cylinder generally comprises a cylinder body 1 in which a first piston 2 and a second piston 3 are slidably received in opposing relationship to define a first pressure chamber 4 between the outer end of the first piston 2 and the adjacent end wall of the cylinder body 1 and a second pressure chamber 5 between the opposed inner ends of the pistons 2 and 3, respectively, within the cylinder body 1. The first piston 2 has a reduced diameter in the intermediate portion between the opposite ends of the piston to define an annular fluid supply chamber 6 in cooperation with the inner surface of the cylinder body 1 and longitudinally spaced flanges on the piston and the fluid pressure supply chamber is isolated from the pressure chambers 4 and 5 by means of seal members 7, 8 and 9 and is in communication with a reservoir 10 through a radial passage 11 in the wall of the cylinder body 1. The seal member 7 is against the outer end face of the left-hand flange while the seal members 8 and 9 are against the opposite end faces of the right-hand flange, respectively.

The cylinder body 1 has the body 12 of a control valve mechanism integral therewith and the control valve mechanism body 12 includes a fluid passage 13 which is in communication at one end with the first pressure chamber 4 and at the other end with a rear wheel brake cylinder (not shown) and a fluid passage 14 which is in communication at one end with the second pressure chamber 5 and at the other with a front wheel brake cylinder (not shown). The control valve mechanism body 12 further includes a stepped fluid passage 15 which intersects and is in communication with the fluid passage 13 and the stepped fluid passage 15 has a larger diameter portion 15a and a smaller diameter portion 15b. Slidably positioned in the larger diameter passage portion 15a is a stepped piston 16 which includes a larger diameter portion 16a and a smaller diameter portion 16b and similarly, slidably positioned in the smaller diameter passage portion 15b is a differential piston 17 which has a diameter smaller than that of the larger diameter portion 16a of piston 16 but greater than that of the smaller diameter portion 16b of piston 16. The piston 16 has an axial bore 18 and a cross bore intersecting the axial bore 18 at right angles to form a portion of the fluid passage connecting the axial bore 18 and the fluid passage 13. The larger diameter portion 16a of the piston 16 is biased toward the smaller diameter portion of the pasage 15 by a spring 20 through a washer 19 and is also subjected to the fluid pressure flowing from the rear wheel brake system while the smaller diameter portion 16b of the piston 16 is sealed with respect to the fluid passage 15 by means of a seal member 22 and abuts against the rod portion 17a of the differential piston 17. The end of the differential piston 17 opposite from the piston 16 is subjected to the fluid pressure flowing from the front wheel brake system through the fluid passage 14 and a fluid passage 14' which extends to the smaller diameter portion 15b from the fluid pressure 14 at right angles thereto. An annular space 21 is defined between the outer surface of the rod portion 17a of the differential piston 17 and the inner surface of the stepped fluid passage 15 between the differential piston 17 and piston 16. The annular space 21 is isolated from the fluid passages 13 and 14 by means of seal members 22 and 23 so that the fluid pressure in the pressure chambers 4 and 5 will not directly act on the annular space 21. A valve 24 is mounted in a position opposed to and normally spaced from the end of the axial bore 18 in the piston 16, said valve 24 being biased toward the outer end of the piston 16 by means of a spring 25 to close the end of the axial bore 18 when piston 15 moves sufficiently far to the left in the figure.

The body 12 of the control valve mechanism is provided with a radial passage 26 which is directly opposite the radial passage 11 and extends between the annular space 21 and the supply chamber 6 of the master cylinder whereby the annular space 21 is always in communication with the reservoir 10 through the passage 26, fluid pressure supply chamber 6 and passage 11 regardless of the position of the differential piston 17, the piston 16 and first piston 2. Thus, the fluid pressure within the annular space 21 is always maintained at atmospheric pressure. For this purpose, it is important that the radial passage 26 be axially aligned with the passage 11. Such axial alignment between the passages 11 and 26 accelerates the flow of liquid through the passage 26.

The operation of the master cylinder having a fluid pressure control valve mechanism according to the invention and as described hereinabove will be now described.

When the master cylinder is operated to brake a running vehicle, piston 3 is urged to the left, and the fluid pressure from the first pressure chamber 4 is guided through the fluid passage 13 including the axial bore 18 as a portion thereof to the rear wheel brake while the fluid pressure from the second pressure chamber 5 is guided through the fluid passage 14 to the front wheel brake to thereby brake the vehicle. In such a case, since the biasing force acting on the differential piston 17 to urge the piston leftwards as seen in the FIGURE is greater than that acting on the piston 16 due to the spring 20 and on the smaller diameter portion 16a of the piston 16 to urge the piston 16 rightwards as seen in the FIGURE, the differential piston 17 and piston 16 move leftwards together until the valve 24 closes the axial bore 18 in the piston 16 whereupon the larger diameter portion 16a of the piston 16 presents an increased effective pressure receiving area. This in turn makes the biasing force acting on the piston 16 to urge the piston rightwards greater than that acting on the differential piston 17 to urge the piston leftwards and thus, the piston 16 and differential piston 17 move rightwards together as seen in the FIGURE until the valve 24 opens the axial bore 18 in the piston 16 whereby the biasing force acting on the differential piston 17 to urge the piston leftwards again becomes greater than that acting on the piston 16 to urge the piston rightwards. By repeating this procedure, the fluid pressure within the master cylinder is so controlled that the rear wheel brake pressure becomes smaller than the front wheel brake pressure.

After the master cylinder has been used for a long period of time, the seal members 22 and 23 might wear as the result of repeated sliding movement of the piston 16 and differential piston 17 within the stepped fluid passage 15 and allow the fluid pressure from the fluid passages 13 and 14 to leak past the worn seal members 22 and 23 into the annular space 21. However, such leaked fluid pressure can flow through the passage 26, master cylinder fluid pressure supply chamber 6 and fluid passage 11 back into the reservoir 10 and will not be permanently trapped in the annular space 21.

Therefore, in the master cylinder having the fluid pressure control valve mechanism of the invention, since the annular space 21 is in communication with the reservoir 10 through the fluid pressure supply chamber 6, the fluid pressure will never be trapped in the annular space 21 and the sliding movement of the piston 16 and differential piston 17 will not be impeded. If the fluid pressure is permanently trapped in the annular space 21, the sliding movement of piston 16 and differential piston 17 is interferred with in the stepped fluid passage 15 to a degree that the control function of the fluid pressure control mechanism 12 will be impeded. A dust cover to prevent external moisture and/or dust from entering the annular space 21 is not required. Such dust covers should be provided in any conventional master cylinder of the type in which the annular space merely opens to the external air or atmosphere. Thus, the master cylinder of the invention can be simply and economically constructed.

The present invention is not limited to only the embodiment as shown and described hereinabove, but can be embodied as follows, for example.

1. In place of the illustrated tandem master cylinder, the master cylinder may be a single master cylinder in which one piston is slidably received in the cylinder and defines only one pressure chamber in the cylinder or a dual master cylinder in which one stepped piston is slidably mounted received in the cylinder and defines two isolated pressure chambers in the cylinder.

2. Although the fluid pressure control valve mechanism is shown as being operated under fluid pressure from two systems, the fluid pressure control valve mechanism may be the one which operates under fluid pressure from one system to perform a control function as shown in Japanese Patent Publication No. 17,244/1971, for example or one in which the fluid pressure system associated with the front wheel brake is controlled as shown in Japanese Patent Publication No. 125,776/1974, for example, in place of the illustrated control valve mechanism in which the fluid pressure system associated with the rear wheel brake is maintained at a fluid pressure level lower than the fluid pressure level for the fluid pressure system associated with the front wheel brake. The fluid pressure control valve mechanism of the present invention is especially advantageous as compared with the type of fluid pressure control valve mechanism in which fluid pressure is trapped in the above-mentioned annular space and the control function of the mechanism is impeded.

While only one embodiment of the invention has been shown and described in detail, it will be understood that the same is for illustration purpose only and is not to be taken as a definition of the invention, reference being had for this purpose to the appended claims.

What is claimed is:

1. The combination of a master cylinder for a brake system and a fluid pressure control valve mechanism, said combination comprising:

a master cylinder body having a cylinder bore therein, one end of which is closed and the other end open;

two axially spaced piston members slidably positioned within said cylinder bore, the piston member closer to said closed end defining a first pressure chamber between said closed end and said closer piston member, and means spacing the other piston member from said closer piston for defining a second pressure chamber between the two piston members, said closer piston member having a pair of flanges spaced therealong for defining at least one fluid supply chamber therebetween within said cylinder bore, and seal members associated with said flanges within the bore, the seal member closer to said closed end of the cylinder bore functioning as a check valve for allowing fluid from said supply chamber to pass into the first pressure chamber;

a reservoir means at a pressure lower than the pressure normally present in said pressure chambers and said master cylinder body having a passage therein through which said reservoir means is in open communication with said fluid supply chamber;

said master cylinder body having a control valve mechanism body having a control valve bore therein and fluid pressure control valve means in said control valve bore, said control valve bore having one end portion in communication with said first pressure chamber, the other end portion in communication with the second pressure chamber, said control valve mechanism body further having a rear wheel brake fluid passage in communication with said first of said pressure chambers through said one end portion, and a front wheel brake fluid passage in communication with said second pressure chamber through the other end of said control valve bore;

said fluid pressure control valve means slidably positioned in said bore, the respective portions of said valve bore receiving the pressure from the respective brake fluid passages, said valve means having a solid stepped piston with a pressure receiving area at both ends, the effective pressure receiving area at the end receiving the pressure from the front wheel brake fluid passage being larger than the effective area at the end receiving the pressure from the rear wheel brake fluid passage pressure, said stepped piston being movable in said bore past said rear wheel brake fluid pressure when it moves;

said pressure control valve means and the inner surface of said control valve bore defining between them a space substantially liquid tightly isolated from both brake fluid passages; and said master cylinder body having a communication bore between said space and said supply chamber, whereby, when the control valve means slides within said bore of said control valve mechanism body, any fluid within said space can escape to said supply chamber through said communication bore.

2. The combination as claimed in claim 1 in which said cylinder bore and said control valve bore are parallel to each other.

3. The combination as claimed in claim 1 or claim 2 in which one end of said control valve bore is open and the other end is closed, and further comprising a plug for closing the open end of said control valve bore and releasably engaged in said open end of said control valve bore.

* * * * *

UNITED STATES PATENT AND TRADEMARK OFFICE
CERTIFICATE OF CORRECTION

PATENT NO. : 4,356,694
DATED : November 2, 1982
INVENTOR(S) : Naganori KOSHIMIZU et al.

It is certified that error appears in the above-identified patent and that said Letters Patent are hereby corrected as shown below:

On the title page add:

--[30] Foreign Application Priority Data

July 25, 1977  Japan ... 89037/1977--

For line [63] read:

--[63] Continuation of Ser. No. 920,357, June 29, 1978, abandoned.--.

Signed and Sealed this

Ninth Day of August 1983

[SEAL]

Attest:

GERALD J. MOSSINGHOFF

*Attesting Officer*          *Commissioner of Patents and Trademarks*